Nov. 11, 1952  H. P. KANEHL  2,617,508
REVERSIBLE TYPE ROLLER CLUTCH
Filed Aug. 1, 1947  2 SHEETS—SHEET 1
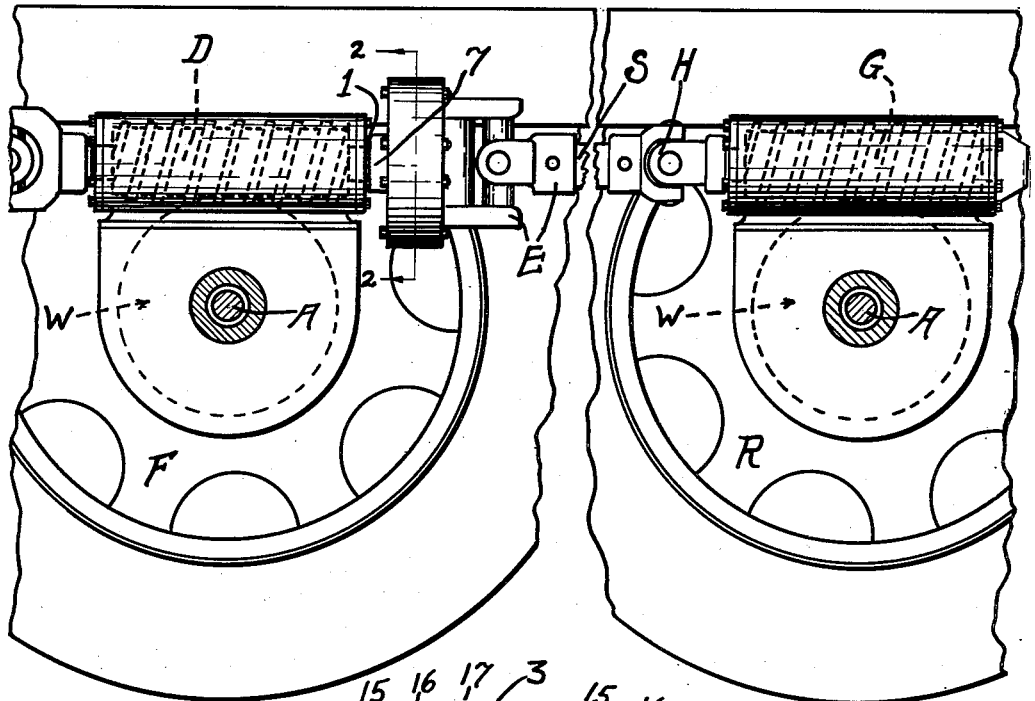
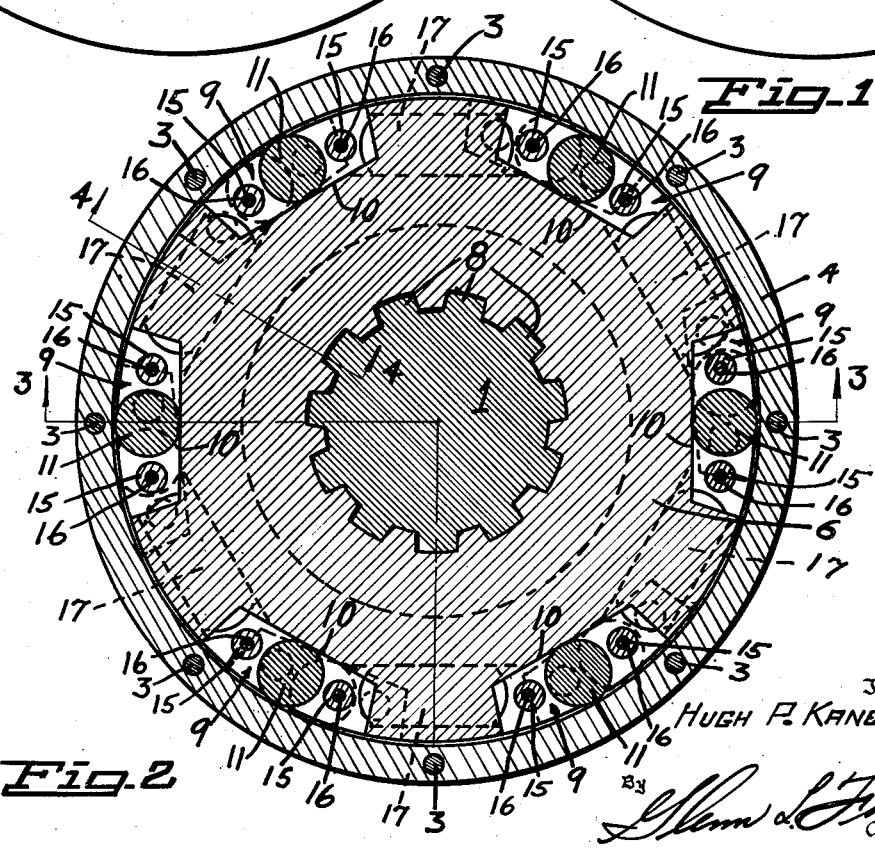
Inventor
HUGH P. KANEHL
By Glenn L. Fish
Attorney Nov. 11, 1952     H. P. KANEHL     2,617,508
REVERSIBLE TYPE ROLLER CLUTCH
Filed Aug. 1, 1947     2 SHEETS—SHEET 2
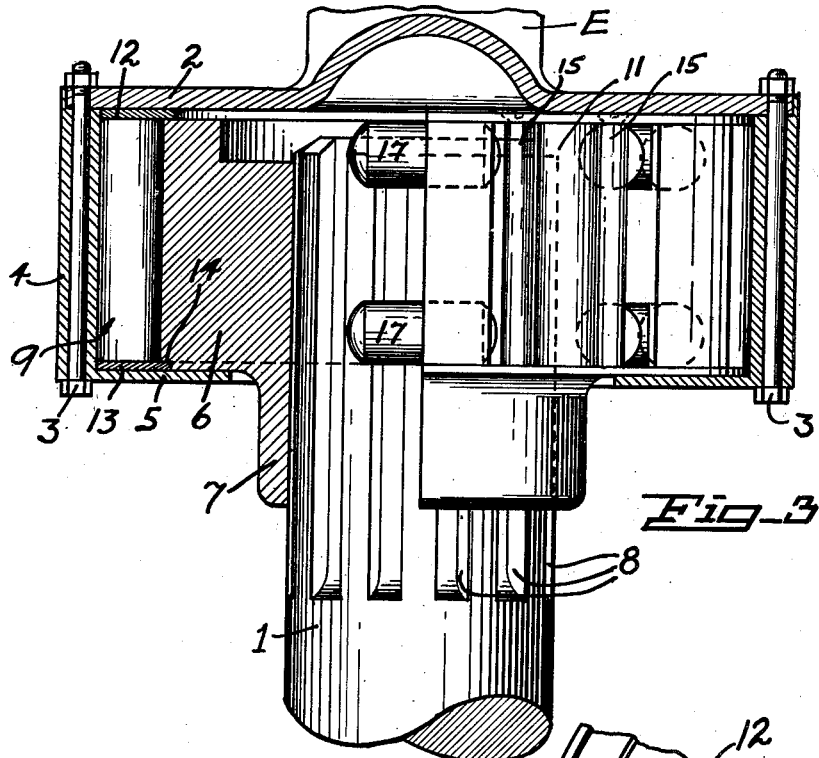
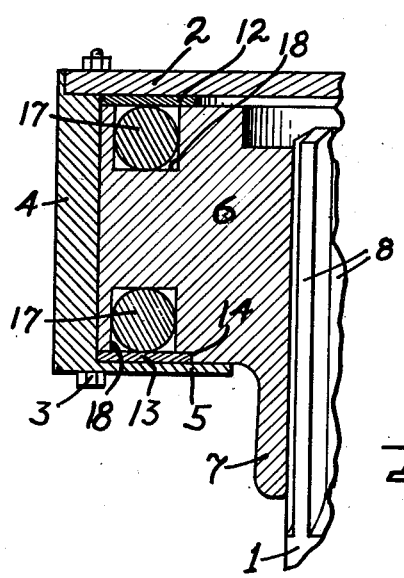
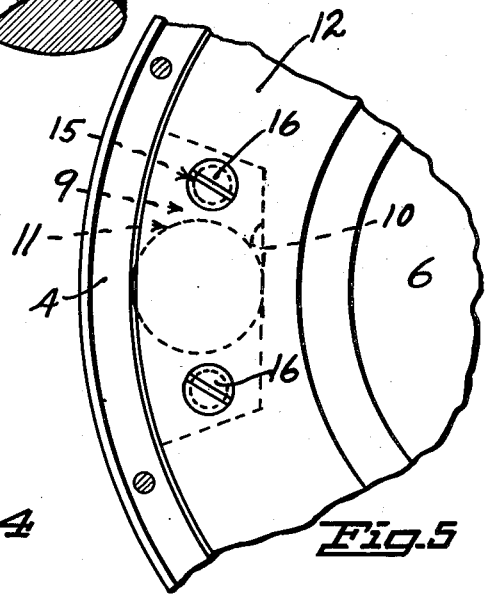
Inventor
HUGH P. KANEHL Patented Nov. 11, 1952

2,617,508

UNITED STATES PATENT OFFICE 2,617,508

REVERSIBLE TYPE ROLLER CLUTCH

Hugh P. Kanehl, Spokane, Wash.

Application August 1, 1947, Serial No. 765,523

2 Claims. (Cl. 192—44)

My present invention relates to the general class of flexible shaft couplings which while adapted to different uses are especially designed for the transmission of power in the propulsion of automotive vehicles or trucks equipped with tandem wheels, and the invention relates more specifically to an improved reversible type roller clutch or rotary mechanical friction clutch for axially aligned shafts transmitting power to adjoining drive units for tandem wheels.

In the conventional lineal or straight-through propelling mechanism for automotive trucks with tandem-drive, the vehicle wheels or tires must be matched very closely or excessive strains are added to the driving mechanism, and additional friction is set up between the rolling surfaces of the wheels or tires and the road-bed.

These additional strains and friction are in direct proportion to the difference in diameters of the sets of wheels or tires on the front and rear driving axles. The smaller wheels are attempting to roll faster and the larger wheels to roll slower in order to each cover the same lineal-distance, while being turned at the same speed, by the straight through solid coupling mechanism.

It is the purpose of my present invention to introduce flexibility into the driving mechanism between the front and rear driving units of a tandem-drive set and at the same time maintain full traction on both driving axles in either direction of rotation, and insure an equalized and uniform transmission of power to both driving units. With my torque-clutch installed, as shown in Fig. 1, where differences in wheel or tire sizes are encountered, the wheels or tires of smaller diameters are mounted on the rear driving unit of a tandem-drive, and the larger wheels or tires are mounted on the front driving unit.

Thus the rear, or smaller-diameter wheels or tires will turn at greater speed than the larger-diameter wheels or tires. By interposing my invention, a flexible coupling, or torque-clutch, this is made possible and practical through the ablity of the outer, or driven casing, to move faster than the inner driving-member, or impeller-head, in either direction of rotation, thereby relieving all parts of the driving mechanism of all loads, except those required to carry and propel the vehicle. The wheels or tires are also thereby devoid of any frictional load except that imposed by carrying the load and providing traction.

The invention consists essentially in certain novel features of construction and combinations and arrangements of parts involving an impeller head, an enclosing housing or socket, and an intermediate torque cage with friction rollers for forward and reverse transmission of power, as will hereinafter be described and more specifically set forth in the appended claims.

In the accompanying drawings I have illustrated a complete example of a physical embodiment of my invention wherein the parts are combined and arranged in accord with one mode I have devised for the practical application of the principles of my invention. It will however be understood that changes and alterations are contemplated and may be made in these exemplifying drawings and mechanical structures, within the scope of my claims, without departing from the principles of the invention.

Figure 1 is a fragmentary and foreshortened view in elevation disclosing two drive units of a tandem arrangement for the wheels of a truck, together with a shaft coupling embodying my invention.

Figure 2 is an enlarged transverse vertical sectional view through the flexible torque coupling at line 2—2 of Fig. 1.

Figure 3 is a sectional view through the impeller-head or drive member and the housing or driven member, as at line 3—3 of Fig. 2, showing also a partial plan view of the rotary cage and friction rollers of the clutch.

Figure 4 is a horizontal sectional view of portions of the impeller head and housing or socket, showing the relation thereto of the centrifugally operated weights forming presser heads.

Figure 5 is a fragmentary face view of Fig. 4 with the head plate of the housing removed, showing part of one of the slip rings of the roller cage.

In order that the general arrangement and utility of parts may readily be understood I have designated the front wheel F and the rear wheel R of a tandem arrangement in Fig. 1, each having an axle A equipped with a gear wheel W, while the front wheel F has a drive worm gear D and the rear wheel R has a driven worm gear G, as indicated by dotted lines.

Power is transmitted to the driving worm gear D in usual manner, and a power shaft or spline shaft I is connected thereto for transmitting power through the differential coupling, thence through a coupling shaft S and universal joints E and H to the worm gear G of the rear wheel R.

Two of the arms of the flexible joint E are rigid with or integral with a circular head plate 2 that is bolted at 3 to an open end cylindrical housing 4 having an open center end wall 5.

A circular impeller head or core 6 is rotatably mounted within the housing and provided with an exterior hub 7 that is rigidly mounted, as by splines 8 upon the power shaft 1.

For clutching or coupling the relatively rotatable impeller head 6 and the rotor or housing 2, the impeller head is provided with a peripheral series of outwardly open pockets 9 each having a tangentially arranged wall or bearing face 10 and a solid cylindrical roller 11 is retained at its opposite ends within the pocket by a pair of slip rings 12 and 13 forming lateral parts of a torsional cage mounted within the housing with ring 12 against a flat face of the impeller head, and ring 13 seated in an exterior annular groove 14 on the opposite face of the impeller head.

Each roller is thus carried, or floated, in its peripheral pocket and confined by the cage between an outer arcuate or concave wall of the housing; and the inner tangential plane bearing face 10 of a pocket in the head, so that either a forward or a reverse rotation of the impeller will thrust the roller into a decreasing space of a pocket, thereby imparting a frictional drive between the impeller head and the surrounding housing.

The cage, in each pocket, is provided with a pair of impact bars or standards, 15, 15, one at each side of a roller, and these bars with their ends abutting against the laterally spaced slip rings of the cage are secured to the rings by tie-screws 16 passed through bores drilled in the slip ring 12 and impact bars 15 and threaded into the slip ring 13.

For actuating the torsional cage to turn on its slip rings and press one annular series of impact bars against the rollers, a series of centrifugally operated weights or presser-heads 17 of solid cylindrical shape are mounted in pairs in laterally open recesses 18 of the impeller head.

As best seen in Fig. 4 these laterally open recesses or cavities 18 in the opposite faces of the impeller head are angular in cross section, they are tangentially arranged about the center of the coupling, and at their opposite ends they communicate with or open into the ends of the pockets 9.

By this arrangement of alternating pockets and recesses in the impeller head, the loosely mounted weights or presser heads 17 in their recesses, are projected under centrifugal force, or torque, with their front or forward ends entering adjoining pockets for positive engagement with the impact bars. This pressing engagement of the presser heads with the impact bars turns the cage, one set of the bars pushes against the rollers forcing them into the decreasing space toward one end of the pockets, and the frictional engagement between the rollers and the tangential bearing faces of the impeller head together with the frictional contact of the rollers with the inner periphery of the housing, transmits rotary motion and power to the housing and the parts driven thereby.

Upon reverse rotation of the shaft 1, another set of impact bars are forced into engagement with the rollers for a coupling action between the impeller head and the housing, and a reverse rotary motion and power are transmitted to the parts driven by the coupling.

Having thus fully described my invention, what I claim as new and desire to secure by Letters Patent is:

1. A reversible rotary coupling for two axially alined shafts lying between tandem rear axles, comprising an impeller head adapted to be secured to one of said shafts and formed in its periphery with a plurality of circumferentially spaced pockets each presenting a tangentially disposed bearing wall, said head also being provided with bores connecting adjacent pockets and each so located as to occupy the chord of a circle traversing the pockets and taken about the center of the head as an axis, a cylindrical housing enclosing the pockets and adapted to be secured to the other said shaft, the enclosing wall of said housing acting with the tangential development of the bearing walls of the pockets to produce narrowing throats at the opposite ends, circumferentially considered, of each pocket, a respective transversely arranged roller mounted in each said pocket to occupy a position between the tangential wall of the pocket and the pocket-enclosing inner wall of the housing, a respective slidable plunger housed in each said bore, and means arranged and adapted to be brought by said plungers into operative engagement with the rollers for influencing the latter to move into said narrowing throats described at the ends of the pockets to cause the head and housing to rotate in unison when the rotational velocity of the head is suddenly changed and regardless of the direction of rotation of the head, said plungers admitting to a minor amount of free movement endwise to their axes so as to be free to gain momentum relative to the impeller head and the said means before acting on the latter.

2. The structure of claim 1 wherein said means comprises ring members disposed at opposite ends of the head to close the sides of the pockets, said ring members being shiftable freely in a rotary direction relative to both the head and the enclosing housing, and cross-rods uniting said ring members and extending through the pockets to occupy positions between the rollers and the plungers and spaced from the latter, the cross-rods acting to engage and move the rollers by force of thrust derived from the plungers.

HUGH P. KANEHL.

REFERENCES CITED

The following references are of record in the file of this patent:

UNITED STATES PATENTS

| Number | Name | Date |
| --- | --- | --- |
| 1,397,819 | Munters | Nov. 22, 1921 |
| 1,738,212 | Smith | Dec. 3, 1929 |
| 1,844,286 | Joseph | Feb. 9, 1932 |
| 1,875,858 | Doring | Sept. 6, 1932 |
| 1,906,560 | Fishburn | May 2, 1933 |
| 2,061,288 | Murray | Nov. 17, 1936 |
| 2,172,653 | Flogans | Sept. 12, 1939 |
| 2,262,330 | MacNeil et al. | Nov. 11, 1941 |
| 2,292,988 | Bloomfield et al. | Aug. 11, 1942 |
| 2,350,627 | Malachowski | June 6, 1944 |
| 2,433,553 | Heintze | Dec. 30, 1947 |